United States Patent [19]

Black et al.

[11] Patent Number: 5,579,133

[45] Date of Patent: Nov. 26, 1996

[54] REAR VIEW MIRROR STRUCTURE

[76] Inventors: George D. Black, 9694 Sheffield Rd., Perrysburg, Ohio 43551; George S. Wade, 5544 Citation Rd. N, Toledo, Ohio 43615

[21] Appl. No.: 466,363

[22] Filed: Jun. 6, 1995

Related U.S. Application Data

[63] Continuation of Ser. No. 76,001, Jun. 11, 1993, abandoned, which is a continuation-in-part of Ser. No. 993,055, Dec. 18, 1992, abandoned.

[51] Int. Cl.$^6$ ............................. G02B 5/08; G02B 7/182; B60R 1/06; B60R 1/08
[52] U.S. Cl. ........................... 359/866; 359/872; 359/875
[58] Field of Search ........................... 359/850, 855, 359/864, 865, 866, 868, 872, 875

[56] References Cited

U.S. PATENT DOCUMENTS

| | | | |
|---|---|---|---|
| 2,705,904 | 4/1955 | Tagliaferri | 359/866 |
| 3,501,227 | 3/1970 | Landen | 359/866 |
| 3,628,851 | 12/1971 | Robertson | 359/868 |
| 4,331,382 | 5/1982 | Graff | 359/868 |
| 4,859,046 | 8/1989 | Traynor et al. | 359/850 |

FOREIGN PATENT DOCUMENTS

| | | | |
|---|---|---|---|
| 0631602 | 11/1961 | Canada | 359/866 |
| 1844924 | 9/1961 | Germany | 359/864 |
| 2158258 | 5/1973 | Germany | 359/868 |
| 2744409 | 4/1979 | Germany | 359/866 |
| 55-36112 | 3/1980 | Japan | 359/866 |
| 0186443 | 7/1989 | Japan | 359/850 |
| 93017892 | 9/1993 | WIPO | 359/866 |

*Primary Examiner*—Ricky D. Shafer
*Attorney, Agent, or Firm*—Donald R. Fraser

[57] ABSTRACT

An attachment for an existing rear view mirror structure of an automobile, said attachment including a one-piece mirror for attachment to the existing mirror structure, the one-piece mirror including a flat portion and an angled portion separated by a concave radius.

8 Claims, 4 Drawing Sheets

REAR VIEW MIRROR STRUCTURE

RELATION TO PRIOR APPLICATIONS

The present application is a continuation-in-part of application Ser. No. 08/076,001 filed on Jun. 11, 1993, now abandoned, which is 07/993,055 filed on Dec. 18, 1992, now abandoned, in the names of joint inventors George D. Black and George S. Wade. The benefit of the earlier filing date of the parent application is specifically requested.

BACKGROUND OF THE INVENTION

1. Field of the Invention

The present invention relates to a rear view mirror structure for automotive vehicles. More particularly, the present invention relates to a rear view mirror structure for use by a vehicle operator to see any other vehicle in the "blind spot" that a vehicle normally has relative to a second vehicle in the lane beside.

2. Description of the Prior Art

Attempts in the art to solve the safety hazard caused by the "blind spot," i.e. the portion of the field of vision to the rear of the vehicle that a vehicle operator normally cannot see with conventional rear view mirror structures, has been long standing in the art. A search of the records of the United States Patent and Trademark Office reveals that this problem has existed in the art practically since the advent of the enclosed automobile.

Numerous attempts to solve this problem have been made. One attempt involves altering the standard rear view mirror typically located at the upper central portion of the windshield of a vehicle. patent such as U.S. Pat. No. Re. 17,274 to E. Porter; No. 1,977,019 to F. L. Smith; and No. 2,869,425 to H. Kershaw are attempts at altering the standard rear view mirror by providing curved or angled fixed portions at the ends of the mirror.

U.S. Pat. No. 4,695,138 to Epstein; No. 4,832,476 to Gabrielyan; and No. 4,643,544 to Loughran represent a later attempt in the art to solve the problem by providing hingedly mounted portions at the extremity of the normally planar rear view mirror which can be adjusted by the driver to help in viewing the "blind spot" next to the automobile.

A similar prior art attempt is manifested in U.S. Pat. No. 5,124,847 to Qi Hua Gong which discloses a mirror which has a pair of extensible side mirrors adjacent to stationary center mirror.

These attempts at altering the normal rear view mirror have proved less than satisfactory because of the confusion caused the operator of the motor vehicle. The vehicle operator is concerned with the "blind spot" when performing a variety of operations connected with the operation of the vehicle. These operations may include changing lanes, passing another vehicle, or backing the vehicle, with or without an auxiliary vehicle, such as a boat or trailer, attached.

While the "blind spot" is of concern during a large number of operations, the actual percentage of time during which a vehicle operator performs these functions is very small. Yet, the aforementioned prior art devices provide the driver a view of the "blind spot" at all times, some of them with considerable distortion. This causes the operator to constantly sort out what is immediately behind, and beside him, one hundred percent of the time, when the problem is only present a much smaller percentage of the time.

Thus, the search for a solution to this problem also evidences structures directed to a rear view mirror structure of an automobile, but more commonly referred to as a side view mirror. This type mirror is only in the operator's field of vision when needed. Two representative structures are shown in U.S. Pat. No. 2,582,651 to J. G. Peterson, and U.S. Pat. No. 4,859,046 to Rodney P. Traynor. These devices have provided an advance in the attempt to solve the "blind spot" problem for the operator of the motor vehicle, but also have drawbacks. The Peterson device is not remotely operable from inside the motor vehicle by the operator. The Traynor device, while being remotely operable, is of a unnecessarily complicated and expensive construction. Thus, those in the art still sought an effective and inexpensive solution to this problem.

Another prior art structure directed to side view mirrors is the widely available convex mirror which can be glued to a normal rear view mirror. One example is the Part No. 492002 Hot Spots mirror sold by CIPA USA of Port Huron, Mich. These are sold by numerous suppliers. However, while this structure is useful to indicate that there may be a car in the blind spot, it has been found that mirrors this type lead to confusion because of the distortion caused by convex mirrors. Thus, even this simple device did not solve the problem longstanding in the prior art.

SUMMARY OF THE INVENTION

The present invention solves the "blind spot" problem by providing a simple flat or planar mirror, and an easily available adhesive fastening means, to provide a simple add-on attachment to the standard mirror found on today's cars without the need to modify the mirror, or provide the complicated construction of the prior art.

In a modification of the present invention, a one-piece mirror having two planar portions, one at an angle to the other, is provided for attachment to a standard mirror without alterations.

In a further modification of the present invention, a construction suitable for original equipment installation is provided.

Thus, it is an object of the present invention to provide an add-on mirror attachment, or original equipment installation, which will aid the driver of a motor vehicle in seeing any vehicle which may be present in the blind spot normally associated with said vehicle.

A further object of the present invention is to provide a flat mirror having a single planar portion for attachment to a conventional mirror at an angle therewith which permits viewing the "blind spot."

Another object of the present invention is to provide an improved one-piece mirror construction containing two planar or flat reflective surfaces, one at an angle with the other, which is easily attachable to a conventional side or rear view mirror.

Another object of the present invention is to provide an original equipment conventional side or rear view mirror assembly having a remotely adjustable mirror therein, the mirror having two planar or flat reflective surfaces, one forming an angle with the other.

Another object of the present invention is to provide an improved rear view mirror structure which is of simple and dependable construction.

Further objects and advantages of the present invention will be apparent from the following description and appended claims, reference being made to the accompany-

It is to be understood that the invention is not limited in its application to the details of construction and arrangement of parts illustrated in the accompanying drawings, since the invention is capable of other embodiments, and of being practiced or carried in various ways within the scope of the claims. Also, it is to be understood that the phraseology and terminology employed herein is for the purpose of description, and not of limitation.

DESCRIPTION OF THE PREFERRED EMBODIMENTS

Figure 1:
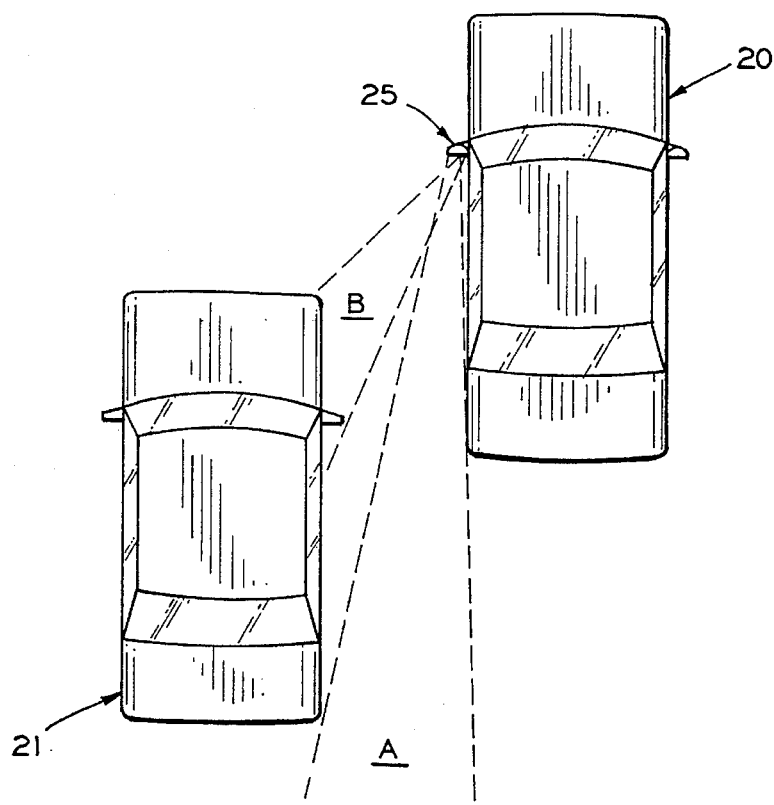
FIG. 1 is a top plan view showing a vehicle having a rear view mirror structure embodying the construction of the present invention. The field of vision of the standard rear view mirror attached to the side of the vehicle is indicated as "A." A second field of vision, indicated as "B," is provided by the second reflective surface provided by the present invention.
Figure 2:
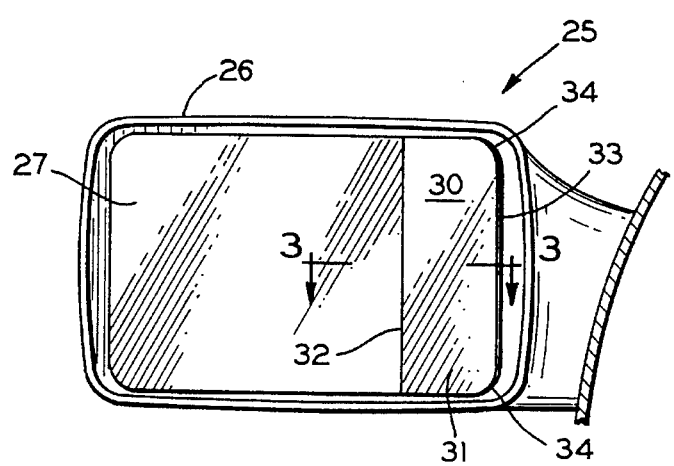
FIG. 2 is an elevational view of the side or rear view mirror shown in FIG. 1.
Figure 3:
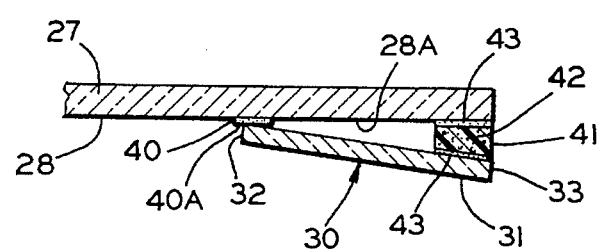
FIG. 3 is a sectional view, taken in the direction of the arrows, along the section line 3—3 of FIG. 2.

Referring now to FIGS. 1–3, there is shown a first or lead vehicle indicated generally by the numeral 20, and a second or following vehicle, slightly behind and to the side of the first vehicle 20, and indicated generally by the numeral 21. The lead vehicle 20 has a rear or side view mirror structure, generally indicated by the numeral 25, which the operator of the vehicle 20 uses to view a first or normal field of vision "A" showing the following vehicle 21 several lengths behind the first vehicle 20.

The rear view mirror structure 25 may have a hollow housing 26 which is firmly attached to the vehicle 20 by means well known in the art. A standard, flat or planar mirror 27, which may be adjustable, is fixedly attached to, and remotely movable within the hollow housing or cavity 26, also by means well known in the art. The mirror 27 includes planar surface 28. To one side of planar surface 28, preferably toward an inside portion 28A, an attachment, generally designated by the numeral 30, is provided.

The attachment 30, in its most preferred embodiment, includes a flat or planar mirror 31 of rectangular or other cross section having a first longitudinal edge 32, a second longitudinal edge 33, and rounded corner portions 34. As is shown in FIG. 3, the mirror 31 is preferably of rectangular cross-section and is attached to the mirror 27 by a double-sided adhesive 40, which may be such as a No. 5354 black adhesive made by Minnesota Mining and Manufacturing Company of St. Paul, Minn.

In order that the flat mirror 31 makes the proper angle with the mirror 27 to enable the motor vehicle operator to see the second field of view "B," a foam tape 41 of the proper thickness, and being double-backed with adhesive, such as the No. 4008 foam tape, also manufactured by Minnesota Mining and Manufacturing Company, is used. The proper thickness of foam tape 41 will be selected so that the flat mirror attachment 31 makes an angle of between 1°–5° with the mirror 27. Because of the differences in size of the vehicles 20 to which the mirror assembly 25 is attached, and the difference in positions at which it may be attached, the exact preferable angle for any particular application may need to be determined by experimentation. The foam tape 41 has a body portion 42 made of expanded foam, and a pair of identical adhesive portions 43.

The adhesive 40 and the foam tape 41, because of their resilient nature, also help to damp any vibration transmitted by the adjustable mirror 27 to the attachment 30.

While the attachment 30 may be rotated 180° and attached to the outer edge of the adjustable mirror 27, it is preferable that it be attached to the inner edge. This is because it has been found that the driver associates the following vehicle 21 as being closer than other vehicles which may be seen in the first field of vision "A," and it is less confusing for the driver for the attachment 30 to also be closer.

Figure 4:
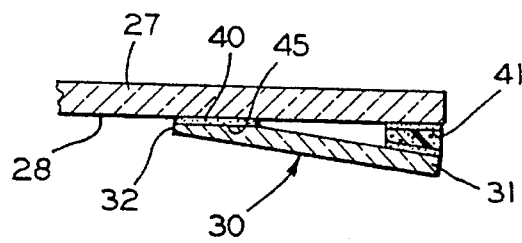
FIG. 4 is a view similar in part to FIG. 3, but showing a modification wherein one of the edges of the attachment of the present invention is bevelled.

Referring now to FIG. 4, there is shown a modification of my invention. The mirror 27, having planar surface 28, is shown exactly as before. However, the mirror portion 31 of attachment 30 is no longer of a rectangular cross-section. There is a bevelled edge portion 45 on the back of the mirror 31 proximate the first longitudinal edge 32. The double-sided adhesive 40 which is used in this modification, may be identical to that used in the modification shown in FIG. 3, but may also be wider. The foam tape 41 may be identical.

Figure 5:
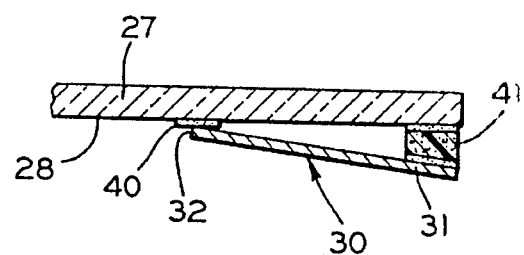
FIG. 5 is a view similar in part to FIG. 3, but wherein the attached mirror is made of stainless steel.

A further modification of my invention is shown in FIG. 5. As before, the mirror 27 with planar surface 28 is the standard equipment provided by the motor vehicle manufacturer. In this case, the flat mirror 31 forming a portion of the attachment 30, is made of stainless steel, while the double-sided adhesive 40 and the foam tape 41 may be identical with that shown in FIG. 3.

In any of these modifications, the first or inner longitudinal edge 32 of the mirror 31 provides a sharp line of demarcation or separation between the images seen of the first field of view "A" in the mirror 27, and the second field of view "B" in the attached mirror 31. If desired, in either modification, the double sided adhesive 40 may extend slightly past the first longitudinal edge 32, as indicated at 40A (FIG. 3), to increase the demarcation between the mirrors (27,31).

Figure 6:
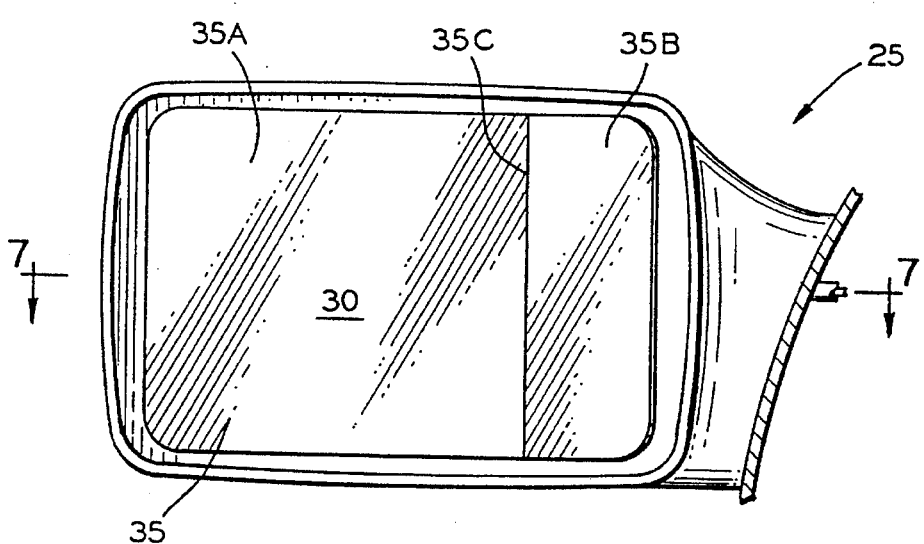
FIG. 6 is a view similar in part to FIG. 2, but showing a one-piece mirror, having a first and a second flat or planar reflective surface, attached to a standard mirror.
Figure 7:
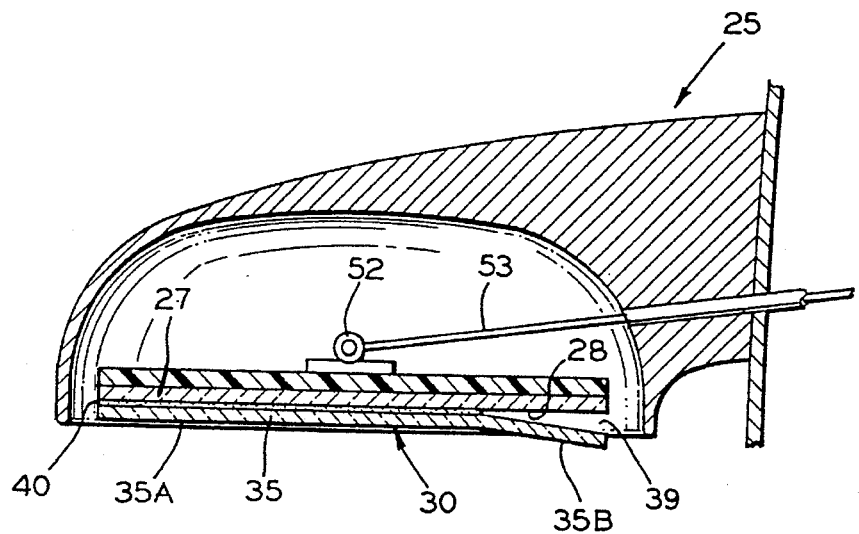
FIG. 7 is a sectional view, taken in the direction of the arrows, along the section line 7—7 of FIG. 6.

A further modification of the present invention is shown in FIGS. 6 and 7. The mirror 27 is shown exactly as before. However, the attachment 30 is no longer a smaller standard flat or planar mirror 31, but a larger one-piece mirror 35, preferably coextensive in size with the adjustable mirror 27, and having a flat portion 35A and a smaller angled portion 35B. The one-piece mirror is provided with a double-sided adhesive 40 on the back portion thereof, and the entire mirror is placed in position over the adjustable mirror 27. A sharp line of separation 35C separates the flat portion 35A of the mirror 35 from the angled portion 35B. As before, the angled portion 35B should preferably form an angle from 1° to 4° with the flat portion 35A. It can be seen that the angled portion 35B of the mirror 35 is spaced from the inner edge of the standard mirror 27, and this provides a small gap indicated by the numeral 39.

In any of the versions thus far shown, the attachment 30 is intended for use either on a manually adjustable type mirror, or on a remotely adjustable mirror. As shown in FIGS. 6 and 7 in the adjustable version, the standard mirror 27 is attached to a mirror pivot 52. The mirror pivot 52 is remotely adjustable by means of cable 53 attached to an adjustment means (not shown) provided inside the vehicle. It should be further understood that any of the attachments 30 may be mounted to stationary or non-adjustable mirrors, and this is well within the scope of the present invention.

Figure 8:
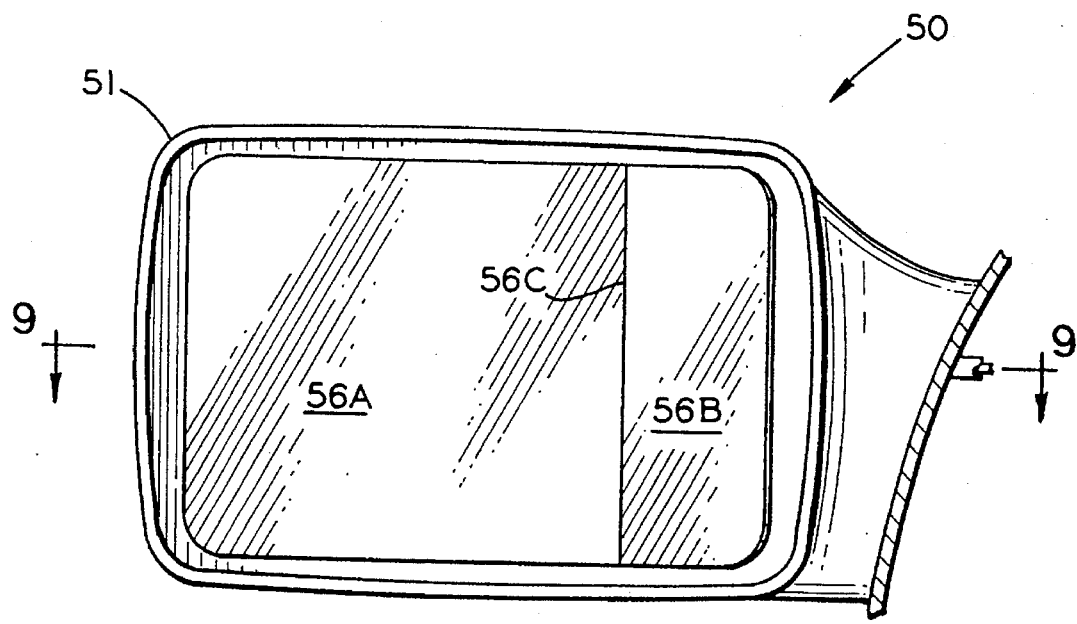
FIG. 8 is a view similar in part to FIG. 6, but showing a modification of the present invention which may be supplied as original equipment on a vehicle.
Figure 9:
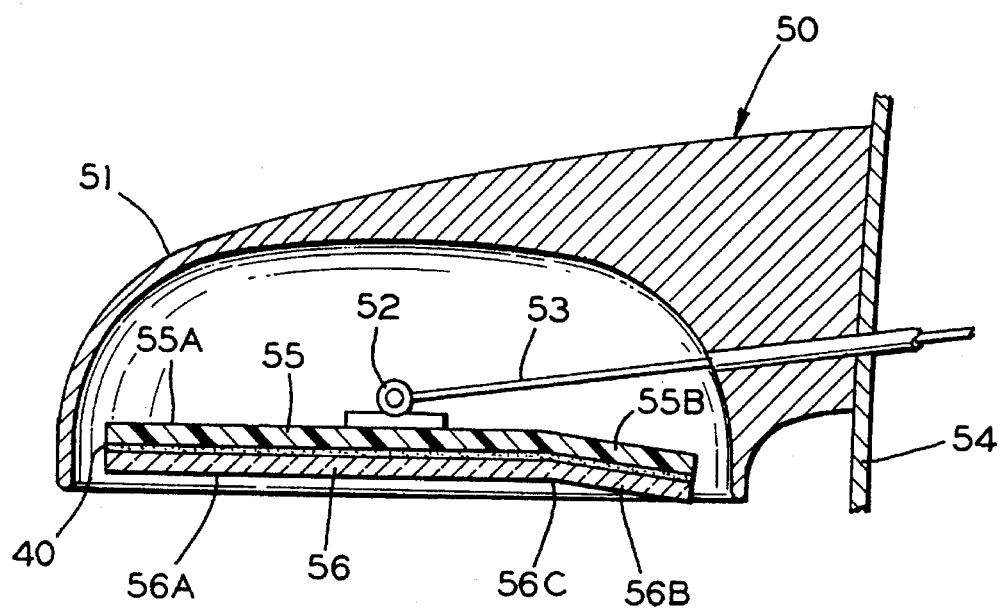
FIG. 9 is a sectional view taken in the direction of the arrows, along the section line 9—9 of FIG. 8.

While the most preferred embodiment of the invention, for lowest cost and ease of construction, involves attachment 30 being attached to the mirror 27, it should be understood that a modification of the present invention is available for installation as original equipment on motor vehicles. This modification of the invention is shown in FIGS. 8 and 9. To differentiate this modification of the invention from that shown in FIGS. 1–7, in FIG. 8, the mirror assembly is designated by the numeral 50.

Mirror assembly 50 has hollow mirror housing 51 attached to a motor vehicle by means well known in the art. A conventional mirror pivot 52 is attached to the hollow housing 51 and is operated by cable 53 traveling through the door skin 54 to a lever (not shown) operated by the operator of the vehicle 20. A mounting member 55, which may be made of any suitable material, is mounted to and is rotated by the mirror pivot assembly 52. The mirror mounting member 55 has a first flat or planar portion 55A, and a second flat or planar portion formed at an angle to the first flat portion and designated by the numeral 55B. The angled portion 55B is preferably at an angle of from 1°–4° with the flat portion 55A.

Connected or attached to the member 55 is a mirror 56 complimentary in shape to the member 55, thus also having a first flat portion 56A and a second flat portion 56B formed at an angle to the first portion 56A. The longitudinal edge of angled portion 56B, indicated by the numeral 56C, should form a sharp demarcation between the two portions of the mirror 56A and 56B, and thus serve the same function as the first longitudinal edge 32 of the attachment 30.

It can be seen that this modification of my invention can easily be adapted by the manufacturers of rear view mirror structures by simply substituting mirror mounting member 55 for the comparable member now used. Thus, a simple and inexpensive original equipment construction of my invention is thereby provided.

Figure 10:
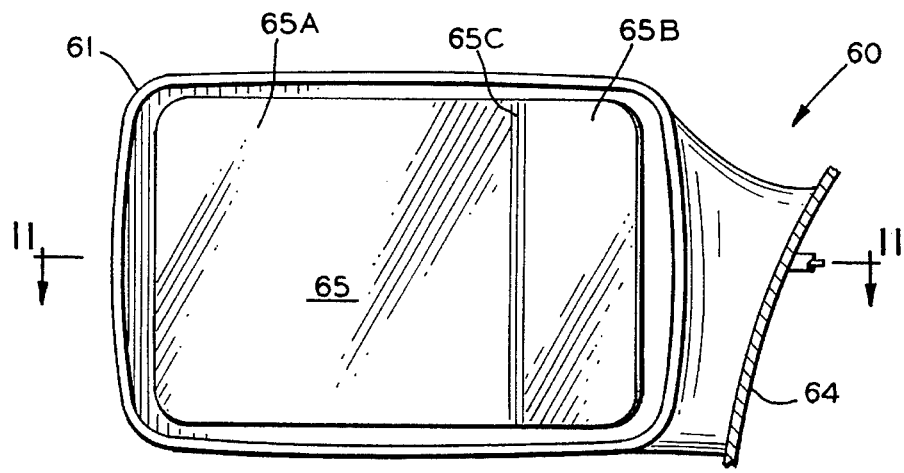
FIG. 10 is a view similar in part to FIG. 2, but showing a modification of the present invention wherein a concave radius is present between the first and second flat or planar reflective surfaces.
Figure 11:
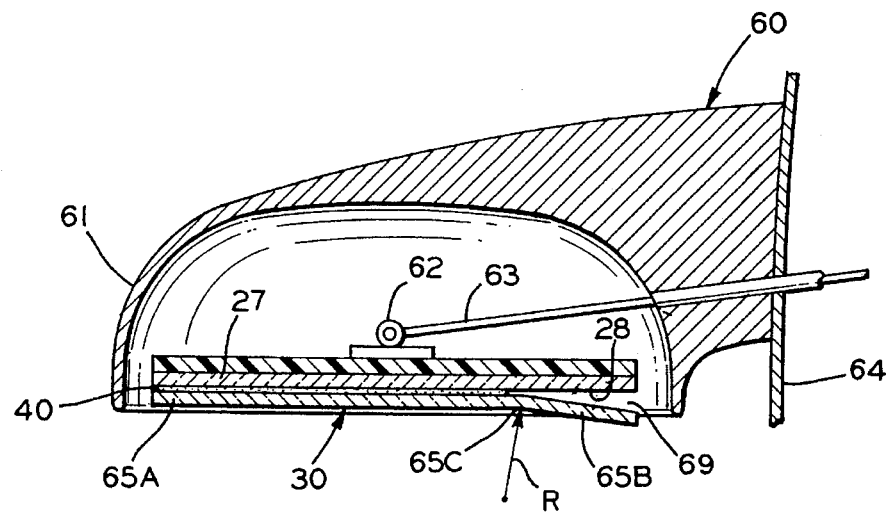
FIG. 11 is a sectional view taken in the direction of the arrows along the section line 11—11 of FIG. 10.
Figure 12:
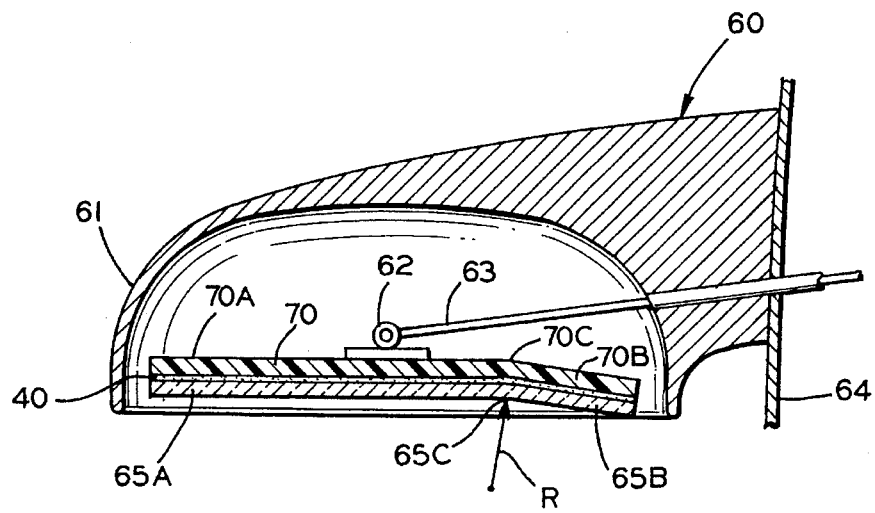
FIG. 12 is a view similar in part to FIG. 11, but showing a modification of the present invention wherein the construction shown in FIG. 10 may be supplied as original equipment on a vehicle.

A further modification of the present invention is shown in FIGS. 10–12. Whether the add-on mirror of FIGS. 6 and 7 is used, or the original equipment mirror of FIGS. 8 and 9 is involved, many drivers find that a sharp line of demarcation (35C, 56C) between the first planar surface ([]5A, 56A) and the second planar surface (35B, 56B) is confusing. A concave radius between the first planar surface and the second planar surface will provide a construction which avoids an abrupt change in image, and is less confusing for the driver. The following car will appear gradually in the second planar surface, and be seen for a longer period of time.

Referring to FIGS. 10 and 11, mirror assembly 60 includes a housing 61 attached to a motor vehicle by means well known in the art. A conventional mirror pivot 62 is attached to the housing 61, and is operated by a cable 63 designed to pass through the vehicle door skin 64, to an operating lever (not shown) within the interior of the associated vehicle. The mirror 27 includes a planar surface 28. One-piece mirror 65, preferably coextensive in size with the adjustable mirror 27, and having a flat portion 65A and a smaller angled portion 65B, is provided. The one-piece mirror 65 is provided with a double-sided adhesive 40 on the back portion thereof, and the entire mirror is placed in position over the adjustable mirror 27. Instead of the sharp line of demarcation 35C, there is provided a concave radius 65C. As before, the angled portion 65B should preferably form an angle of from 1° to 4° with a flat portion 65A. It can be seen that the angled portion 65B of the mirror 65 is bent inwardly and spaced from the inner edge of the standard mirror 27, and this provides a small gap indicated by the numeral 69. The numerical value R of the concave or inwardly bending radius 65C will depend on the angle which the angled portion 65B makes with the flat portion 65A.

Referring now to FIG. 12, the original equipment version of the modification of the invention shown in FIG. 11 is shown. As before, mirror assembly 60 has hollow mirror housing 61 attached to a motor vehicle by means well known in the art. A conventional mirror pivot 62 is attached to the housing 61 and is operated by a cable 63 designed to pass through the vehicle door skin 64 to a lever (not shown) within the interior of the associated vehicle 20. A mounting member 70 which may be made of any suitable material, is mounted to, and is rotated by the mirror pivot assembly 62. The mirror mounting member 70 has a first flat or planar portion 70A, and a second flat or planar portion formed at a concave angle to the first flat portion, and designated by the numeral 70B. The angled portion 70B is preferably formed at an angle from 1° to 4° with the flat portion 70A, and has a complimentary concave radius 70C, which is complimentary to concave radius 65C of the mirror 65. Double-sided adhesive 40, or other suitable fastening means may be used to attach mirror 65 to mounting member 70.

By carefully studying the problem of how to eliminate the blind spots which plague motor vehicle operators, a novel and inexpensive rear view mirror structure is provided.

What is claimed is:

1. A rear view mirror structure for a vehicle, including:
   a) a housing for attachment to the vehicle, said housing having a hollow portion;
   b) a mirror pivot attached to said housing in the hollow portion thereof for pivotal movement of a mirror attached thereto and disposed substantially within the hollow portion of said housing;
   c) a mirror holding member having a first side and a second side, said first side being attached to said mirror pivot, and second side being adhesively attached to said mirror and in registration therewith said mirror holding member having a flat portion; and d) said mirror comprises a one-piece mirror member having a first flat portion provided with an image reflecting mirrored surface and a second angled portion provided with an image reflecting mirrored surface, said first flat and said second angled portion joined by a relatively narrow concave radius portion provided with an image reflecting mirrored surface, wherein the mirrored surfaces of said first flat portion, said second angled portion, and concave portion form a continuous image reflecting surface, the second angled portion disposed nearer to the vehicle than the first flat portion to permit view of the lane directly beside the vehicle.

2. The structure defined in claim 1, wherein said one-piece mirror is glass.

3. The structure defined in claim 1, wherein said one-piece mirror is plastic.

4. The structure defined in claim 1, wherein said one-piece mirror is stainless steel.

5. The structure defined in claim 1, wherein said mirror holding member is integral with said mirror.

6. The structure defined in claim 1, wherein said rear view mirror structure is rigidly attached to one side of the vehicle.

7. The structure defined in claim 6, wherein said one-piece mirror is adhesively attached to said mirror holding member with a double-sided adhesive.

8. The structure defined in claim 1, wherein the angled portion of said one-piece mirror is disposed at an angle of more than 1° and less than 4° with respect to the flat portion of said one-piece mirror.

* * * * *